UNITED STATES PATENT OFFICE.

ALBERT BUSCH, OF BRUNSWICK, GERMANY.

PROCESS OF MANUFACTURING SOLUBLE COMPOUNDS OF MERCURIC SALTS WITH HEXAMETHYLENE-TETRAMIN.

No. 930,836.  Specification of Letters Patent.  Patented Aug. 10, 1909.

Application filed July 9, 1908. Serial No. 442,745.

*To all whom it may concern:*

Be it known that I, ALBERT BUSCH, doctor of philosophy, a chemist, and a subject of the reigning Prince of Brunswick, residing in the city of Brunswick, in the Duchy of Brunswick, German Empire, have invented a certain new and useful Process of Manufacturing Soluble Compounds of Mercuric Salts with Hexamethylene-Tetramin, of which the following is a specification.

It is known, that hexamethylene-tetramin forms double salts with mercuric salts, for instance mercuric chlorid. The hexamethylene-tetramin-mercuric-double salts are produced by mixing aqueous or alcoholic solutions of the components, viz. hexamethylene-tetramin and mercuric chlorid. In aqueous solution a precipitate will result of the composition of one molecule of hexamethylene-tetramin to two molecules of mercuric-chlorid; in alcoholic solution, the composition of the precipitate will be one molecule of hexamethylene-tetramin to one molecule mercuric-chlorid. These double salts of hexamethylene-tetramin and mercuric chlorid are very sparingly soluble in water and the usual organic solvents.

I have now discovered that the double salts of hexamethylene-tetramin and mercuric chlorid, mentioned above, which are neither soluble in a solution of an albuminoid nor in a solution of soap, each for itself, becomes soluble when treated with a mixture of the albuminoid—and soap solution. In a solution, obtained in this way, the mercury is bound up in an organic state, that is to say, it is no longer precipitable by the usual reagents such as sulfureted hydrogen, ammonium sulfid, caustic potash, etc. These solutions of hexamethylene-tetramin-mercuric chlorid in albumin and soap solution behave on the other hand quite differently from pure mercuric chlorid solutions. While the latter will precipitate albuminous matter from its solution and corrode, as is well known, the skin, the former neither precipitate a solution of albuminous matter nor do they affect the skin. They are therefore particularly suitable to be used as disinfectants.

My invention consists in the application of this discovery.

When, for instance, dry hexamethylene-tetramin-mercuric chlorid is mixed with an equal weight of an albuminoid, soluble in water, such as albumose, peptone, alkali-albuminate, casein alkali or the like, and the mixture is dissolved in a soap solution, the mercury of the solution is in an organic form and no longer to be precipitated by the usual reagents for precipitation of mercury.

Instead of mixing hexamethylene-tetramin-mercuric-chlorid and albuminous matter, mentioned above, in a dry state and dissolving the mixture in a soap solution, the process may be also performed by incorporating hexamethylene-tetramin-mercuric chlorid in a mixture of soap and albuminous matter, or the hexamethylene-tetramin-mercuric chlorid can be mixed with dry albuminous matter, soluble in water, and this mixture kneaded with solid soap, as in using the soap, thus produced, solution will ensue. Such solutions containing the mercury bound up in an organic form are found to be less corrosive than an equivalent solution of pure mercuric chlorid, although of equal disinfecting power; they are therefore particularly suitable for practical use.

The following examples will show, how the process is to be performed:

Example I: 1.25 grams of dry hexamethylene-tetramin-mercuric chlorid are mixed with an equal weight of albumose and the mixture is introduced into 97.5 ccm. of a soap solution of 5 per cent. strength made by dissolving 50 grams of medicinal soap in one liter of water; the mixture is stirred and gently heated until solution will ensue. The solution thus produced, corresponds with one of mercuric chlorid of about 1 per cent. strength and may be diluted with water as desired.

Example II: 5 grams of medicinal soap and 1.25 grams of albumose are dissolved in about 95 ccm. of luke-warm water and to the solution are added 1.25 grams of hexamethylene-tetramin-di-mercuric chlorid the mixture being stirred until solution takes place. The solution corresponds with one of pure mercuric chlorid of about one per cent. strength and may be diluted as desired.

Example III: 5 kilos of soap powder (medicinal soap) are mixed with 1¼ kilos of albumose and 1¼ kilos of hexamethylene-tetramin-mercuric chlorid and moistened with a small quantity of water. The mixture is then kneaded in a kneading machine and pressed in molds. In using this soap there will result a solution which contains mercuric double salt, albumose and soap in the same proportions as the ingredients are found in the solution of Example II.

Instead of albumose any other albuminous matter, soluble in water, such as peptone, alkali-albuminate or casein alkali may be used.

The proportions of mercuric double salt, albuminous matter and soap may be varied within certain limits, without essentially changing the character of the solution in respect of the organic combination of the mercury.

What I claim and desire to secure by Letters Patent of the United States is:

1. The process of producing solutions of hexamethylene-tetramin-mercuric chlorid which contains the mercury in an organic form not capable of being precipitated by the usual precipitants, by dissolving the mercuric double salt aforesaid in a solution containing a mixture of soap and albuminous matter, which is soluble in water.

2. A disinfecting composition consisting of a product consisting of hexamethylene-tetramin-mercuric chlorid, albuminoids soluble in water, and soap.

3. A disinfecting composition consisting of an aqueous solution containing hexamethylene-tetramin mercuric chlorid, albuminoids soluble in water, and soap.

In witness whereof I have hereunto signed my name in the presence of two subscribing witnesses.

ALBERT BUSCH.

Signed in the presence of—
Dr. Borsum,
Julius Sackel.